(12) United States Patent
Shiwaya (10) Patent No.: US 8,669,749 B2
(45) Date of Patent: Mar. 11, 2014

(54) SWITCHING POWER SUPPLY UNIT

(75) Inventor: Yohichi Shiwaya, Toyonaka (JP)

(73) Assignee: Ricoh Company, Ltd., Tokyo (JP)

( * ) Notice: Subject to any disclaimer, the term of this patent is extended or adjusted under 35 U.S.C. 154(b) by 94 days.

(21) Appl. No.: 12/961,907

(22) Filed: Dec. 7, 2010

(65) Prior Publication Data

US 2011/0133708 A1 Jun. 9, 2011

(30) Foreign Application Priority Data

Dec. 8, 2009 (JP) ................................. 2009-278282

(51) Int. Cl.
*G05F 1/00* (2006.01)

(52) U.S. Cl.
USPC ............................. 323/272; 323/350; 323/351

(58) Field of Classification Search
USPC ........................... 323/351, 225, 271, 272, 350
See application file for complete search history.

(56) References Cited

U.S. PATENT DOCUMENTS

| | | | |
|---|---|---|---|
| 6,236,194 B1 * | 5/2001 | Manabe et al. | 323/274 |
| 7,262,588 B2 * | 8/2007 | Matsuo et al. | 323/282 |
| 7,479,773 B2 * | 1/2009 | Michishita | 323/282 |
| 7,564,196 B2 | 7/2009 | Shiwaya et al. | |
| 7,724,062 B2 * | 5/2010 | Miyazaki | 327/333 |
| 7,884,588 B2 * | 2/2011 | Adragna et al. | 323/272 |
| 7,888,926 B2 * | 2/2011 | Ishino | 323/284 |
| 8,076,914 B2 * | 12/2011 | Shimizu | 323/271 |
| 8,193,793 B2 * | 6/2012 | Kumagai et al. | 323/282 |
| 8,237,422 B2 * | 8/2012 | Singh et al. | 323/282 |
| 2008/0197828 A1 * | 8/2008 | Michishita | 323/282 |
| 2009/0261753 A1 | 10/2009 | Kishioka et al. | |
| 2010/0188065 A1 | 7/2010 | Shiwaya | |
| 2010/0277227 A1 | 11/2010 | Shiwaya | |

FOREIGN PATENT DOCUMENTS

| | | |
|---|---|---|
| JP | 2007-20316 | 1/2007 |
| JP | 2007-124850 | 5/2007 |
| JP | 2008-236869 | 10/2008 |
| JP | 2008-312406 | 12/2008 |
| JP | 2009-118592 | 5/2009 |
| JP | 2009-171710 | 7/2009 |
| JP | 4387170 | 10/2009 |
| JP | 2009-278713 | 11/2009 |

OTHER PUBLICATIONS

Oct. 22, 2013 Japanese official action in connection with corresponding Japanese patent application No. 2009-278282.

* cited by examiner

*Primary Examiner* — Timothy J Dole
*Assistant Examiner* — Kyle J Moody
(74) *Attorney, Agent, or Firm* — Cooper & Dunham LLP (57) ABSTRACT

A switching power supply unit of a non-insulated, synchronous rectification type converts a voltage input to an input terminal into a predetermined voltage and outputs the voltage. The unit includes an inductor, a plurality of output switching elements, a plurality of rectifying switching elements, a switching element control circuit, a switching regulator integrated circuit, and a plurality of buffer circuits. The output switching elements, the rectifying switching elements, the switching element control circuit and the buffer circuits are integrated on the switching regulator integrated circuit.

13 Claims, 8 Drawing Sheets

SWITCHING POWER SUPPLY UNIT

CROSS REFERENCE TO RELATED APPLICATION

The present application is based on and claims priority from Japanese Patent Application No. 2009-278282, filed on Dec. 8, 2009, the disclosure of which is hereby incorporated by reference in its entirety.

BACKGROUND OF THE INVENTION

1. Field of the Invention

The present invention relates to a switching power supply unit as a DC/DC converter, and particularly to a switching power supply unit with low power consumption.

2. Description of the Prior Art

In recent years, demands for electric power saving of electronic devices have been increased. To save power in electronic devices, it is important to improve power conversion efficiency of a power supply unit supplying power to the devices in addition to a reduction in the power consumption of the devices. A switching regulator is commonly used for the power supply unit. The switching regulator is configured to convert electric power supplied to an input terminal to a predetermined voltage for outputs.

There are two types of the switching power supply unit as a diode rectification type using a diode and a synchronous rectification type using a rectifying switching element instead of a diode. The switching power supply unit comprises an output switching element, a rectifying diode or a rectifying switching element, an inductor, and a capacitor. Further, there are another four types of switching power supply unit as a buck type which steps down an output voltage from an input voltage, a boost type which steps up an output voltage from an input voltage, a buck-boost type which can step up/down an output voltage from an input voltage, a reverse type which can generate an output voltage in reverse polarity to that of an input voltage.

Figure 8:
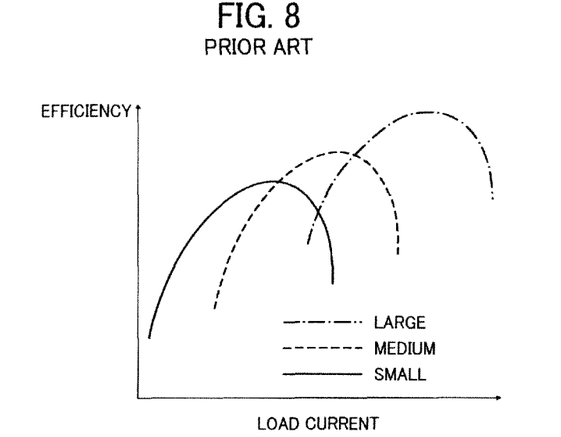
FIG. 8 shows characteristic curves of load current to power conversion efficiency of the prior art switching power supply unit with general power conversion efficiency.

FIG. 8 shows an example of characteristic curves of a load current to power conversion efficiency of a prior art switching power supply unit having general power conversion efficiency. The characteristic curves are of transistors in three sizes (large, medium, small) used in each switching element. It is apparent from the drawing that peak values or magnitude of the power conversion efficiency differ depending on the size of a transistor used for the switching element in the switching power supply unit.

Various techniques for improving the power conversion efficiency of the switching power supply unit have been proposed. One of such techniques is to optimize charge/discharge currents along with a parasite capacitance of each switching element by changing a transistor size of the output switching element and that of the rectifying switching element in accordance with a load level. For example, Japanese Patent Application Publication No. 2007-20316 (Reference 1) and No. 2007-124850 (Reference 2) disclose a technique to improve the power conversion efficiency by detecting a magnitude of a load current (output current) with a load current detecting circuit and changing transistor sizes of the output switching element and the rectifying switching element depending on a detected value of the load current. In general, the larger the transistor size on an IC chip, the larger the power (allowable current amount) of the transistor, the smaller the on-resistance and the larger the parasite capacitance.

Figure 7:
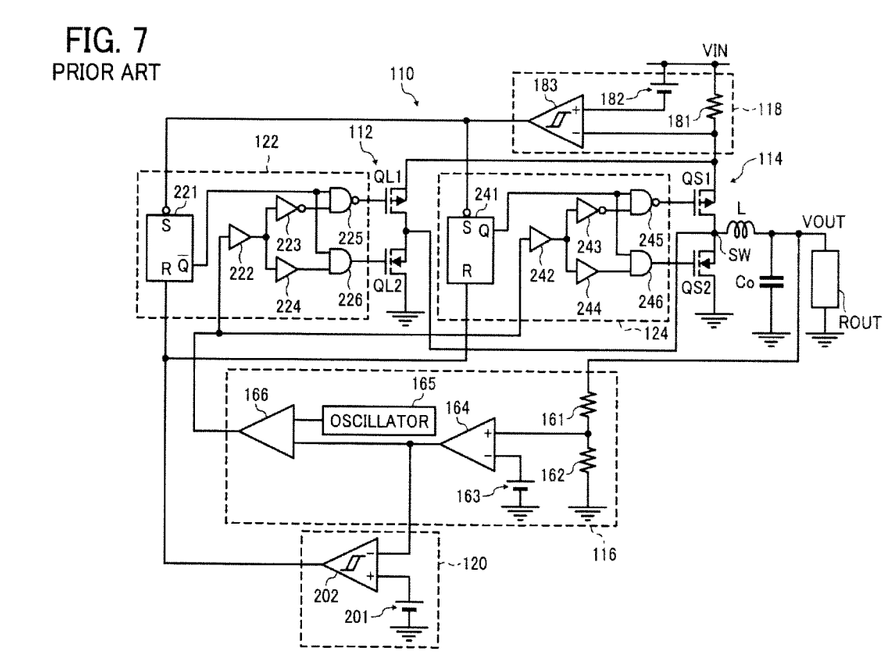
FIG. 7 shows an example of a circuit configuration of a prior art switching power supply unit.

FIG. 7 is a circuit diagram of an example of a prior art switching power supply unit using the above technique (disclosed in Reference 2, for example). A buck-type switching power supply unit 110 in FIG. 7 comprises a large power converter 112, a small power converter 114, an input current detection circuit 118, and an output voltage detection circuit 120. The input current detection circuit 118 switches a converter in use from the large power converter 112 to the small power converter 114, upon detecting that an input current Iin is smaller than a predetermined current value. The output voltage detection circuit 120 switches a converter in use from the small power converter 114 to the large power converter 112, upon detecting that an output voltage VOUT is smaller than a predetermined voltage. Thus, the switching power supply unit switches the large and small power converters 112, 114 in accordance with electric power necessary for a load ROUT.

Further, Reference 2 discloses switching power supply units of a boost type, a synchronous rectification type, and a diode rectification type, for example.

The switching power supply unit 110 in FIG. 7 comprises a resistance 181 for current-voltage conversion connected in series between an input terminal IN and output switching elements QL1, QL2 in order for the input current detection circuit 118 to detect magnitude of the input current Iin. The switching power supply unit 110 is configured to improve the power conversion efficiency by switching the large power converter 112 to the small power converter 114 when required power for a load is low. However, there is a problem that a power loss due to the resistance 181 is non-negligibly large with the power conversion efficiency during a low load state taken into account. To reduce a power loss in the resistance 181, a resistance value thereof has to be reduced. However, with a low resistance value of the resistance 181, a larger current is flowed therein, which makes it necessary to increase a layout size of the resistance 181 on an IC chip. This accordingly causes a problem with increasing the entire circuit footprint on the IC chip on which the switching power supply unit is integrated. Moreover, the input current detection circuit 118 and the output voltage detection circuit 120 incorporated in the switching power supply unit 110 also cause an increase in the entire circuit footprint on the IC chip.

Furthermore, another problem with the switching power supply unit 110 is that since the transistor sizes of the output switching element and the rectifying switching element are automatically selected by a detected load current, a user cannot select an optimal transistor size according to a load in use.

SUMMARY OF THE INVENTION

The present invention aims to provide a switching power supply unit which does not require a large chip size and enables a user to optimally select transistor sizes of an output switching element and a rectifying switching element depending on the magnitude of a load current.

According to one aspect of the present invention, a switching power supply unit of a non-insulated, synchronous rectification type which converts a voltage input to an input terminal into a predetermined voltage and outputs the voltage, comprises an inductor; a plurality of output switching elements which perform switching in accordance with an on/off control signal input to a control electrode and charge the inductor with the input voltage; a plurality of rectifying switching elements associated with the output switching elements and discharging the inductor when the associated output switching elements are turned off to stop charging the inductor; a switching element control circuit which generates and outputs a switching control signal which allows the output switching elements to perform switching and the rectifying switching elements to perform reverse switching to the switching of the output switching elements so that the output voltage turns to the predetermined voltage; a switching regulator integrated circuit including a select control terminal to which a select signal is input from an exterior; and a plurality of buffer circuits associated with the output switching elements and the rectifying switching elements and each controlling, in response to the select signal, an associated pair of the output switching element and the rectifying switching element to operate in accordance with the switching control signal from the switching element control circuit, wherein the output switching elements, the rectifying switching elements, the switching element control circuit and the buffer circuits are integrated on the switching regulator integrated circuit.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENTS

Figure 1:
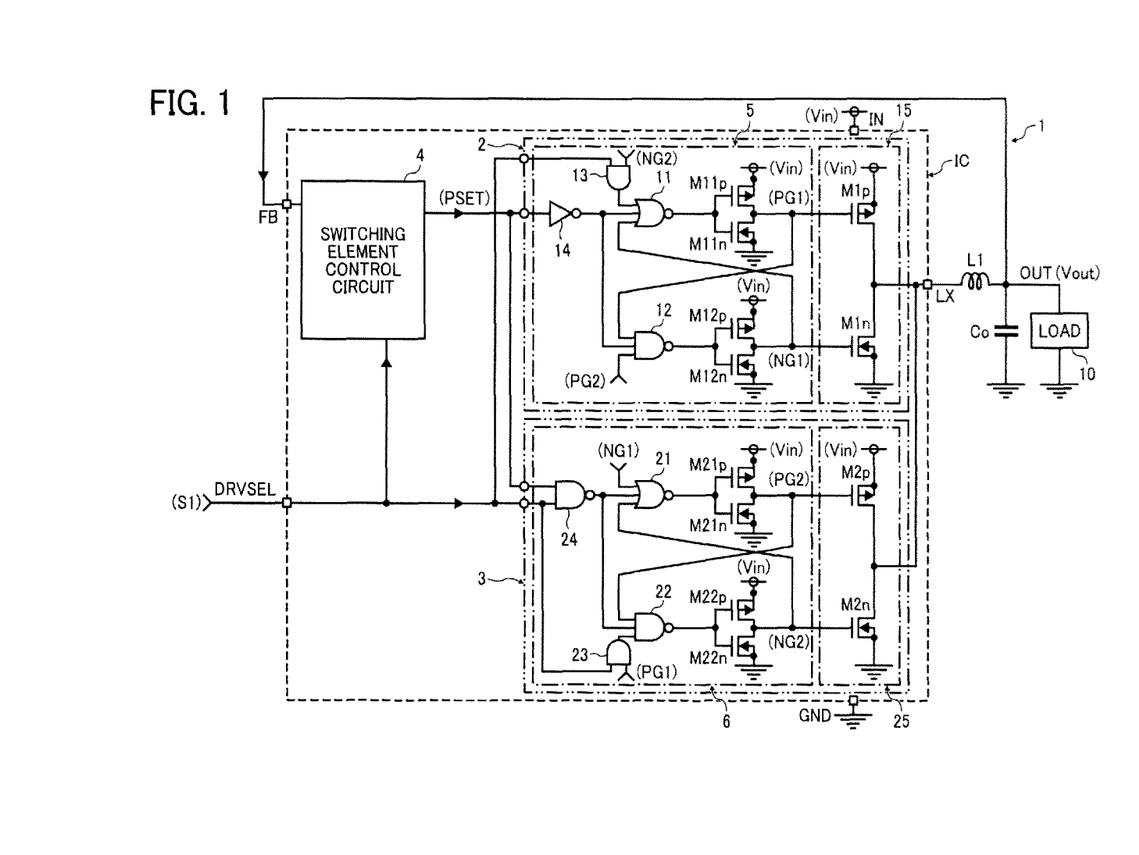
FIG. 1 shows an example of a circuit configuration of a switching power supply unit according to a first embodiment of the present invention.

Hereinafter, embodiments of the present invention will be described in detail with reference to the accompanying drawings. Wherever possible, the same reference numbers will be used throughout the drawings to refer to the same or like parts.
First Embodiment FIG. 1 shows a circuit configuration of a switching power supply unit according to the first embodiment of the present invention by way of example. A switching power supply unit 1 is of a synchronous rectification, buck type and configured to convert a voltage Vin supplied to an input terminal IN into a predetermined voltage Vout and supply it to a load 10.

The switching power supply unit 1 comprises converters 2, 3, a switching element control circuit 4, an inductor L1, and a capacitor Co. Note that the switching power supply unit 1 is a non-insulated, buck type including the two converters 2, 3 and the basic control operation of the converter does not change depending on the number of converters.

Every circuit of the switching power supply unit 1 except for inductor L1 and the capacitor Co is integrated on a single switching regulator IC which comprises an input terminal IN, a feedback terminal FB, a control terminal DRVSEL as a converter selecting control terminal, a connection terminal LX, and a ground terminal GND. The ground terminal GND is grounded, and the input terminal IN is applied with a voltage Vin. The converter 2 comprises a PMOS transistor M1$p$ as an output switching element, an NMOS transistor M1$n$ as a rectifying switching element, and a buffer circuit 5. The PMOS transistor M1$p$ performs switching between the input terminal IN and the connection terminal LX. The buffer circuit 5 generates on/off control signals PG1, NG1 which allow the PMOS transistor M1$p$ and NMOS transistor M1$n$ to perform switching, respectively, and outputs them to gates of the PMOS transistor M1$p$ and the NMOS transistor M1$n$. Similarly, the converter 3 comprises a PMOS transistor M2$p$ as an output switching element, an NMOS transistor M2$n$ as a rectifying switching element, and a buffer circuit 6. The PMOS transistor M2$p$ performs switching between the input terminal IN and the connection terminal LX. The buffer circuit 6 generates on/off control signals PG2, NG2 which allow the PMOS transistor M2$p$ and the NMOS transistor M2$n$ to perform switching, respectively, and outputs them to gates of the PMOS transistor M2$p$ and the NMOS transistor M2$n$.

The buffer circuit 5 comprises PMOS transistors M11$p$, M12$p$, NMOS transistors M11$n$, M12$n$, a NOR circuit 11 with three inputs, a NAND circuit 12 with three inputs, an AND circuit 13 with two inputs, and an inverter circuit 14. The buffer circuit 6 comprises PMOS transistors M21$p$, M22$p$, NMOS transistors M21$n$, M22$n$, a NOR circuit 21 with three inputs, a NAND circuit 22 with three inputs, an AND circuit 23 with two inputs, and a NAND circuit 24 with two inputs. The switching element control circuit 4 is configured to detect a voltage Vout output from a load connector OUT between the switching power supply unit 1 and the load 10 and control the buffer circuits 5, 6 to turn the voltage Vout to a predetermined voltage. The buffer circuit 5 is configured to perform switching over the PMOS transistor M1$p$ and the NMOS transistor M1$n$ to reverse ON/OFF states thereof while the buffer circuit 6 is configured to perform switching over the PMOS transistor M2$p$ and the NMOS transistor M2$n$ to reverse ON/OFF states thereof. Also, the buffer circuits 5, 6 comprise general buffer functions and are configured to selectively use the converters 2, 3 according to a signal level input to the control terminal DRVSEL. The inductor L1 is connected between the connection terminal LX and the load connector OUT and the capacitor Co and the load 10 are connected between the load connector OUT and the ground GND.

In the converter 2 the PMOS transistor M1$p$ is connected between the input terminal IN and the connection terminal LX, and the NMOS transistor M1$n$ is connected between the connection terminal LX and the ground GND. Further, the PMOS transistor M11$p$ and the NMOS transistor M11$n$ are connected in series between the input terminal IN and the ground GND, to constitute an inverter circuit. The connecting point of the PMOS transistor M11$p$ and the NMOS transistor M11$n$ is an output of the inverter circuit which is connected to a gate of the PMOS transistor M1$p$. Gates of the PMOS transistor M11$p$ and the NMOS transistor M11$n$ are connected with each other and a connecting point thereof is an input of the inverter circuit which is connected to an output of the NOR circuit 11.

Further, in the converter 2 the PMOS transistor M12$p$ and the NMOS transistor M12$n$ are connected in series between the input terminal IN and the connection terminal LX, to constitute an inverter circuit. The connecting point of the PMOS transistor M12$p$ and the NMOS transistor M12$n$ is an output of the inverter circuit which is connected to a gate of the PMOS transistor M1n. Gates of the PMOS transistor M12p and the NMOS transistor M12n are connected with each other and a connecting point thereof is an input of the inverter circuit which is connected to an output of the NAND circuit 12.

First to third inputs of the NOR circuit 11 are connected to an output of the AND circuit 13, to an output of the inverter circuit 14, and to the connecting point of the PMOS transistor M12p and the NMOS transistor M12n, respectively. First to second inputs of the NAND circuit 12 are connected to a connecting point of the PMOS transistor M11p and the NMOS transistor M11n and to an output of the inverter circuit 14, respectively. A third input of the NAND circuit 12 receives an on/off control signal PG2 via the gate of the PMOS transistor M2p. One input of the AND circuit 13 is connected to the control terminal DRVSEL while the other input thereof receives an on/off control signal NG2 via the gate of the NMOS transistor M2n. A switching control signal PSET is input to the input of the inverter circuit 14 from the switching element control circuit 4.

Similarly, in the converter 3 the PMOS transistor M2p is connected between the input terminal IN and the connection terminal LX, and the NMOS transistor M2n is connected between the connection terminal LX and the ground GND. Further, the PMOS transistor M21p and the NMOS transistor M21n are connected in series between the input terminal IN and the ground GND, to constitute an inverter circuit. The connecting point of the PMOS transistor M21p and the NMOS transistor M21n is an output of the inverter circuit which is connected to a gate of the PMOS transistor M2p. Gates of the PMOS transistor M21p and the NMOS transistor M21n are connected with each other and their connecting point is an input of the inverter circuit which is connected to an output of the NOR circuit 21.

Further, in the converter 3 the PMOS transistor M22p and the NMOS transistor M22n are connected in series between the input terminal IN and the ground GND, to constitute an inverter circuit. The connecting point of the PMOS transistor M22p and the NMOS transistor M22n is an output of the inverter circuit which is connected to a gate of the NMOS transistor M2n. Gates of the PMOS transistor M22p and the NMOS transistor M22n are connected with each other, and their connecting point is an input of the inverter circuit which is connected to an output of the NAND circuit 22.

A first input of the NOR circuit 21 receives an on/off control signal NG1 via the gate of the NMOS transistor M1n. Second to third inputs thereof are connected to an output of the NAND circuit 24 and to a connecting point of the PMOS transistor M22p and the NMOS transistor M22n, respectively. First to third inputs of the NAND circuit 22 are connected to a connecting point of the PMOS transistor M21p and the NMOS transistor M21n, to an output of the NAND circuit 24, and to an output of the AND circuit 23, respectively. One input of the AND circuit 23 is connected to the control terminal DRVSEL while the other input thereof receives an on/off control signal PG1 via the gate of the PMOS transistor M1p. One input of the NAND circuit 24 receives a switching control signal PSET from the switching element control circuit 4 while the other input thereof is connected to the control terminal DRVSEL.

Further, the load connector OUT between the switching power supply unit 1 and the load 10 is connected to the feedback terminal FB which feeds back the voltage Vout of the switching power supply unit 1 to the switching element control circuit 4. The switching element control circuit 4 is configured to generate a switching control signal PSET for output according to a converter select signal S1 and the voltage Vout fed back from the feedback terminal FB to turn the voltage Vout to the predetermined voltage. The converter select signal S1 is input to the control terminal DRVSEL for selecting a converter.

According to the switching power supply unit 1 in FIG. 1, a size of the PMOS transistors M1p, M2p and that of the NMOS transistor M1n, M2n are assumed to satisfy the following relations:

(size of PMOS transistor M1p) < (size of PMOS transistor M2p)

(size of NMOS transistor M1n) < (size of NMOS transistor M2n)

The converter 2 includes a switch pair 15 of a PMOS transistor M1p and an NMOS transistor M1n in small size while the converter 3 includes a switch pair 25 of a PMOS transistor M2p and a NMOS transistor M2n in large size as output and rectifying switching elements. In general, a buffer circuit turning on and off a switching element can be reduced in size when a switching element is small in size. Accordingly, it is possible to reduce power consumption of the buffer circuit for turning on/off the switching element.

According to the switching regulator IC in the first embodiment, the sizes of the buffer circuits 5, 6 are adjusted in accordance with the sizes of the switch pairs 15, 25 so that the buffer circuit 5 is smaller than the buffer circuit 6 in size. Therefore, the buffer circuit 5 consumes less power than the buffer circuit 6 for the switching control.

Thus, when a load current flowing in the load 10 is small, that is, in a low load state, a switching element in a smaller size is selected to turn on/off, which can decrease an amount of charge/discharge current relative to gate capacities of the PMOS transistor M1p and the NMOS transistor M1n as well as decrease the current consumption of the buffer circuit 5. Accordingly, the switching power supply unit 1 can exert improved power conversion efficiency in a low load state.

Further, when a load current flowing in the load 10 is large, that is, in a high load state, the converter 3 including the large size switching element having a small on-resistance is selected, improving the power conversion efficiency in a high load state. Moreover, concurrently driving the converters 2, 3 results in achieving higher power conversion efficiency.

In the above configuration, the switching element control circuit 4 detects the voltage Vout from the load connector OUT and generates a switching control signal PSET for output to turn the voltage Vout to the predetermined voltage. For example, the switching element control circuit 4 executes PWM control to control a pulse width of the switching control signal PSET as a pulse signal so that the voltage Vout turns to the predetermined voltage. With a large voltage Vout, the switching element control circuit 4 reduces a duty ratio of the switching control signal PSET to shorten the on-time of the PMOS transistors M1p, M2p as well as lengthen the on-time of the NMOS transistors M1n, M2n to reduce the voltage Vout output from the switching power supply unit 1.

Oppositely, with a low voltage Vout, the switching element control circuit 4 increases a duty ratio of the switching control signal PSET to lengthen the on-time of the PMOS transistors M1p, M2p as well as shorten the on-time of the NMOS transistors M1n, M2n to increase the voltage Vout output from the switching power supply unit 1. By repeating the above, the output voltage Vout is controlled to be constant at the predetermined voltage.

Next, operation of the converters 2, 3 is described in detail. Note that the converter select signal S1 is input to the control terminal DRVSEL from exterior of the switching regulator IC. During a low load state of the load 10, the converter select signal S1 is set to low level, and an output level of the AND circuit 13 is also turned to low level irrespective of the on/off control signal NG2. Therefore, the NOR circuit 11 and the NAND circuit 12 output signals of levels inverse to each other to the PMOS transistor M1p and the NMOS transistor M1n in accordance with the switching control signal PSET, respectively. Thus, the PMOS transistor M1p and the NMOS transistor M1n perform switching inversely to each other in accordance with the switching control signal PSET.

Similarly, an output level of the AND circuit 23 is turned to low level irrespective of the on/off control signal PG1. An output level of the NAND circuit 24 is turned to high level irrespective of the switching control signal PSET. Therefore, an output level of the NOR circuit 21 is turned into a low level while that of the NAND circuit 22 is turned into high level. Accordingly, the PMOS transistor M2p and the NMOS transistor M2n are both placed into a break state.

Meanwhile, during a high load state of the load 10, the converter select signal Si is turned into high level. An output level of the AND circuit 13 coincides with the level of the on/off control signal NG2. Therefore, an output level of the NOR circuit 11 is turned into low level when at least one of an output signal of the inverter circuit 14 and the on/off control signals NG1, NG2 is turned into high level so that the PMOS transistor M1p is placed into a break state. On the other hand, an output level of the NOR circuit 11 is turned into high level when all of the output signal of the inverter circuit 14 and the on/off control signals NG1, NG2 are turned into low level so that the PMOS transistor M1p becomes conductive.

Further, an output level of the NAND circuit 12 is turned into low level when all of the output signal of the inverter circuit 14 and the on/off control signals NG1, NG2 are turned into high level so that the NMOS transistor M1n becomes conductive. On the other hand, the output level of the NAND circuit 12 is turned into high level when at least one of the output signal of the inverter circuit 14 and the on/off control signals NG1, NG2 is turned into low level so that the NMOS transistor M1n is placed into a break state.

Moreover, the AND circuit 23 outputs a signal of the same level as that of the on/off control signal PG1 to the NAND circuit 24 to turn the output level thereof to be inverse to the level of the switching control signal PSET. The output level of the NOR circuit 21 is turned into low level when at least one of the output signal of the NAND circuit 24 and the on/off control signals NG1, NG2 is turned into high level so that the PMOS transistor M2p is placed into a break state. On the other hand, the output level of the NOR circuit 21 is turned into high level when all of the output signal of the NAND circuit 24 and the on/off control signals NG1, NG2 are turned into low level so that the PMOS transistor M2p becomes conductive.

To the contrary, the output level of the NAND circuit 22 is turned into low level when all of the output signal of the NAND circuit 24 and the on/off control signals PG1, PG2 are turned into high level so that the NMOS transistor M2n becomes conductive. The output level of the NAND circuit 22 is turned into high level when at least one of the output signal of the NAND circuit 24 and the on/off control signals PG1, PG2 is turned into low level so that the NMOS transistor M2n is placed into a break state.

Second Embodiment

Figure 2:
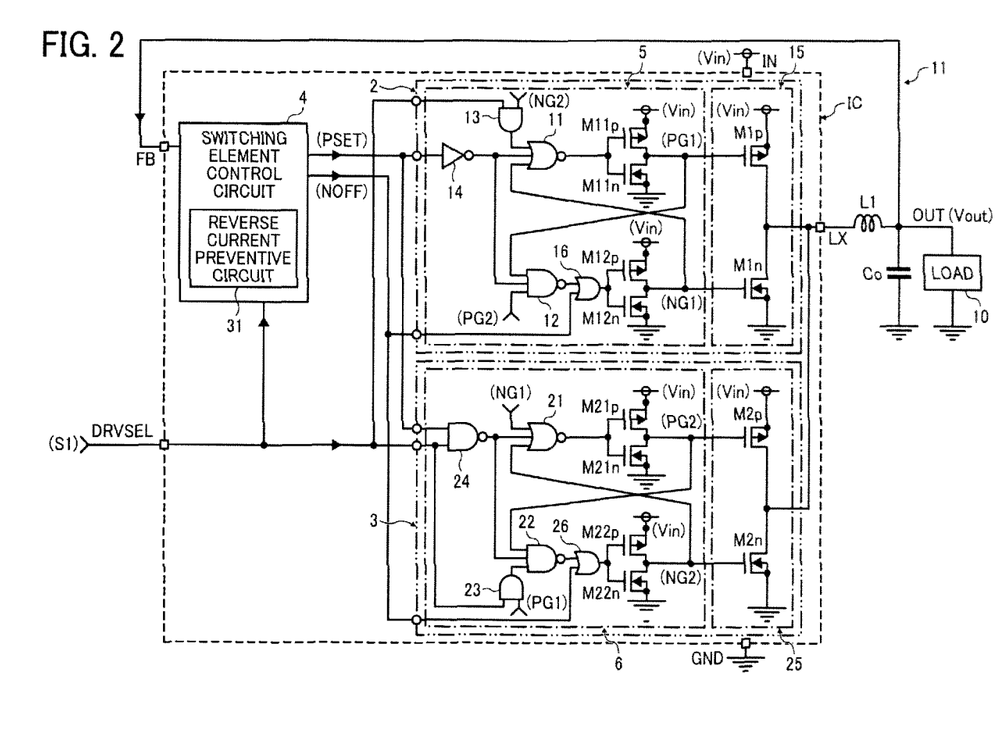
FIG. 2 shows an example of the circuit configuration of a switching power supply unit according to a second embodiment of the present invention.

FIG. 2 shows a switching power supply unit 11 according to a second embodiment which additionally include in the switching regulator IC of FIG. 1 a reverse current preventive circuit which prevents a reverse current flowing from the load connector OUT to the connection terminal LX or a current reversely flowing in the load 10. Only a difference from the unit 1 in FIG. 1 is described in the following. The difference is in addition of a reverse current preventive circuit 31 in the switching element control circuit 4 and OR circuits 16, 26 in the converters 2, 3, respectively.

One input of the OR circuit 16 is connected with an output of the NAND circuit 12 while the other input thereof receives an off-signal NOFF which turns off the NMOS transistor M1n from the reverse current preventive circuit 31. An output of the OR circuit 16 is connected with a connecting point of the gate of the PMOS transistor M12p and that of the NMOS transistor M12n. Likewise, one input of the OR circuit 26 is connected with an output of the NAND circuit 22 while the other input thereof receives the off-signal NOFF from the reverse current preventive circuit 31. An output of the OR circuit 26 is connected with a connecting point of the gate of the PMOS transistor M22p and that of the NMOS transistor M22n.

In the above configuration, the reverse current preventive circuit 31 is configured to be detectable of a voltage of the connection terminal LX (not shown). For example, when a voltage of the connection terminal LX shows a negative value, it determines that occurrence of a reverse current is possible or detected, and outputs an off-signal NOFF of high level. In this case the output level of the OR circuit 16 is turned into high level irrespective of the output level of the NAND circuit 12, and the NMOS transistor M1n is put into a break state. Likewise, the output level of the OR circuit 26 is turned into high level irrespective of the output level of the NAND circuit 22, and the NMOS transistor M2n is put into a break state.

Also, the reverse current preventive circuit 31 determines that there is no possibility or detection of occurrence of a reverse current when a voltage of the connection terminal LX shows zero or more, and outputs an off-signal NOFF of low level. An output level of the OR circuit 16 coincides with that of NAND circuit 12 while an output level of the OR circuit 26 coincides with that of NAND circuit 22. Therefore, the NMOS transistors M1n, M2 operate normally without a break.

Thus, upon detection of a reverse current from the load connector OUT to the NMOS transistors M1n, M2n, the NMOS transistors M1n, M2n are forcibly brought into a break state, thereby preventing occurrence of the reverse current and a decrease in the power conversion efficiency due to the reverse current. Further, with provision of the reverse current detecting function in addition to the control terminal DRVSEL for selecting the converters 2, 3 having switching elements in small and large sizes, respectively, the switching power supply unit 11 can exert improved power conversion efficiency in a low load state.

Third Embodiment

In the above embodiments the switching power supply unit 1, 11 are of a synchronous rectification, buck type. However, the present invention should not be limited thereto, and is applicable to a non-synchronous rectification, buck type switching power supply unit. An example of such a switching power supply unit is described in the following with reference to FIG. 3. A difference from the unit 1 in FIG. 1 is in addition of a rectifying diode D1 instead of the NMOS transistors M1n, M2n and only the difference is described. A switching power supply unit 21 accordingly excludes the PMOS transistors M12p, M22p, NMOS transistors M12n, M22n, NOR circuit 11, 21, NAND circuits 12, 22, and AND circuits 13, 23. It includes inverter circuits 17, 27 in replace of the NOR circuits 11, 21.

Figure 3:
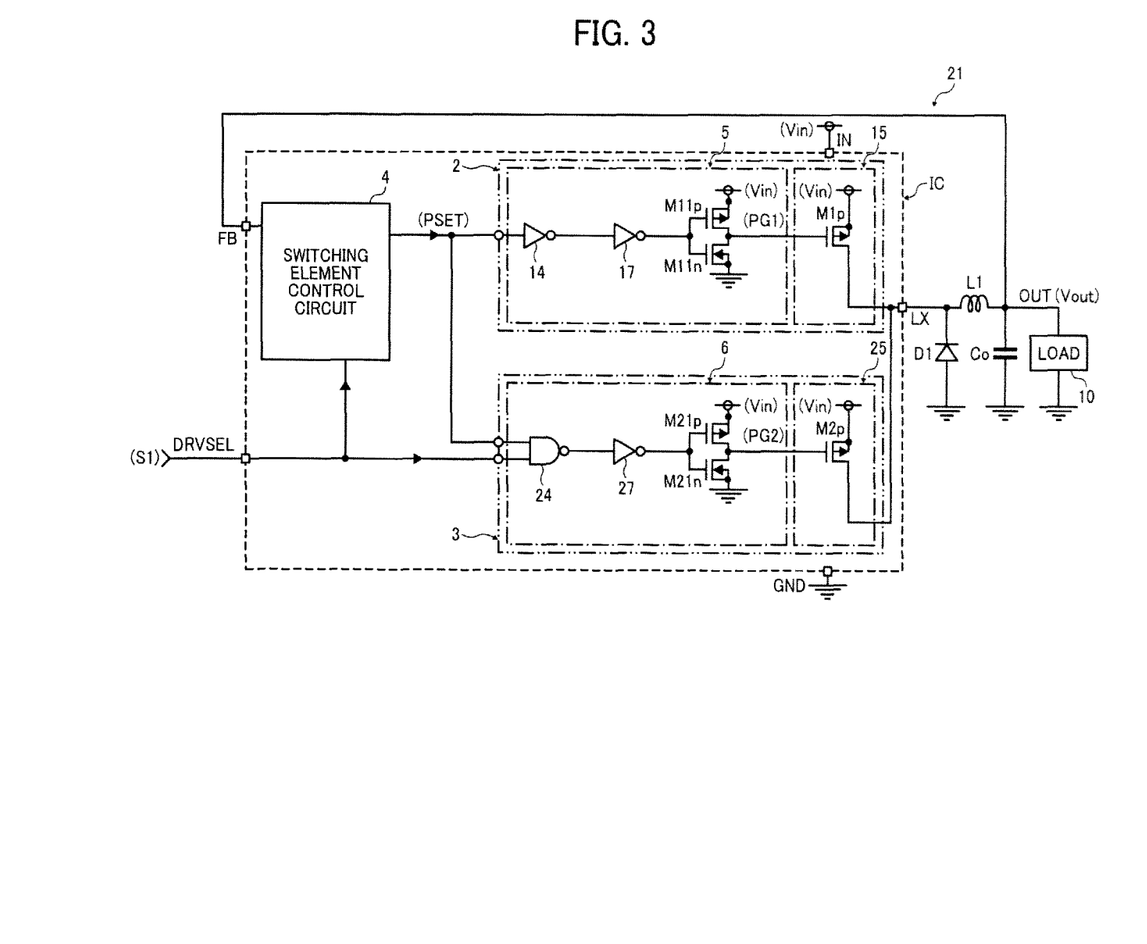
FIG. 3 shows an example of a circuit configuration of a switching power supply unit according to a third embodiment of the present invention.

The switching power supply unit 21 in FIG. 3 comprises the converters 2, 3, switching element control circuit 4, rectifying diode D1 as a rectifying element, inductor L1, and capacitor Co. The converter 2 includes the PMOS transistor M1p and the buffer circuit 5 which outputs an on/off control signal PG1 to the gate of the PMOS transistor M1p for switching operation. The converter 3 includes the PMOS transistor M2p and the buffer circuit 6 which outputs an on/off control signal PG2 to the gate of the PMOS transistor M2p for switching operation.

The buffer circuit 5 comprises the PMOS transistor M11p, the NMOS transistor M11n, and the inverter circuits 14, 17 while the buffer circuit 6 comprises the PMOS transistor M21p, the NMOS transistor M21n, the NAND circuit 24 with two inputs, and the inverter circuit 27. The switching element control circuit 4 is configured to control the buffer circuits 5, 6 to turn the voltage Vout output from the load connector OUT to the predetermined voltage. The buffer circuits 5, 6 allow the PMOS transistors M1p, M2p to perform switching respectively.

All the elements of the switching power supply unit 21 in FIG. 3 except for the rectifying diode D1, inductor L1, and capacitor Co are integrated on a single switching regulator IC. The switching regulator IC comprises the input terminal IN, feedback terminal FB, control terminal DRVSEL, connection terminal LX, and ground terminal GND. The ground terminal GND is grounded and the input terminal IN is applied with the voltage Vin.

The inductor L1 is connected with the connection terminal LX and the load connector OUT while the capacitor Co and the load 10 are connected between the load connector OUT and the ground terminal GND. The connection terminal LX is connected with a cathode of the rectifying diode D1 and an anode of the rectifying diode D1 is connected to the ground terminal GND. In the converter 2 the PMOS transistor M1p is connected between the input terminal IN and the connection terminal LX. The PMOS transistor M11p and the NMOS transistor M11n are connected in series between the input terminal IN and the ground terminal GND. A connecting point of the PMOS transistor M11p and NMOS transistor M11n is connected with the gate of the PMOS transistor M1p. Gates of the PMOS transistor M11p and the NMOS transistor M11n are connected with each other, and a connecting point thereof is connected to an output of the inverter circuit 17 whose input is connected with an output of the inverter circuit 14. A switching control signal PSET is input to an input of the inverter circuit 14.

Similarly, in the converter 3 the PMOS transistor M2p is connected between the input terminal IN and the connection terminal LX. The PMOS transistor M21p and the NMOS transistor M21n are connected in series between the input terminal IN and the ground terminal GND. A connecting point of the PMOS transistor M21p and NMOS transistor M21n is connected with the gate of the PMOS transistor M2p. Gates of the PMOS transistor M21p and the NMOS transistor M21n are connected with each other, and a connecting point thereof is connected to an output of the inverter circuit 27 whose input is connected with an output of the NAND circuit 24. A switching control signal PSET is input to one input of the NAND circuit 24. The other input of the AND circuit 24 is connected to the control terminal DRVSEL.

With the above configuration, the switching element control circuit 4 detects the voltage Vout from the load connector OUT and generates a switching control signal PSET for output to turn the voltage Vout to the predetermined voltage. For example, the switching element control circuit 4 executes PWM control to control a pulse width of the switching control signal PSET so that the voltage Vout turns to the predetermined voltage. With a large voltage Vout, the switching element control circuit 4 reduces a duty ratio of the switching control signal PSET and shortens the on-time of the PMOS transistors M1p, M2p to reduce the voltage Vout output from the switching power supply unit 21.

Oppositely, with a low voltage Vout, the switching element control circuit 4 increases a duty ratio of the switching control signal PSET to lengthen the on-time of the PMOS transistors M1p, M2p to increase the voltage Vout output from the switching power supply unit 21. By repeating the above, the output voltage Vout is controlled to be constant at the predetermined voltage.

During a low load state of the load 10, the converter select signal S1 is set to low level, and an output level of the NAND circuit 24 is turned to high level irrespective of the switching control signal PSET. Therefore, the PMOS transistor M2p is placed into a break state irrespective of the switching control signal PSET. Meanwhile, during a high load state of the load 10, the converter select signal S1 is set to high level so that an output level of the NAND circuit 24 is inverse to a level of the switching control signal PSET.

Due to a decrease in the voltage of the rectifying diode D1 used as an exterior element, the non-synchronous rectification type switching power supply unit 21 in FIG. 3 exerts a slight decrease in the power conversion efficiency. However, it has an advantage of surely preventing occurrence of the reverse current flowing from the load connector OUT to the inductor L1.

Furthermore, the switching power supply unit 21 in FIG. 3 can be configured without the rectifying switching element and circuits controlling the rectifying switching element, enabling a reduction in a layout size of the control circuits. It is advantageous in terms of chip size reduction from the units 1, 11 in FIGS. 1, 2.

Thus, the switching power supply unit 21 according to the present embodiment is configured that only the converter 2 performs switching during the low load state of the load 10 and both of the converters 2, 3 do perform switching during the high load state of the load 10. Therefore, it can maintain high power conversion efficiency in accordance with a load state. Moreover, the switching power supply unit 21 is user-friendly since the two converters 2, 3, switching element control circuit 4, and control terminal DRVSEL are integrated on a single chip. Also, a user can set a signal level applied to the control terminal DRVSEL according to a load level, so that the unit 21 does not need to include circuits or elements for detecting magnitude of a load current. This makes it possible to reduce a chip size and to provide a downsized switching power supply unit.

Fourth Embodiment

Figure 4:
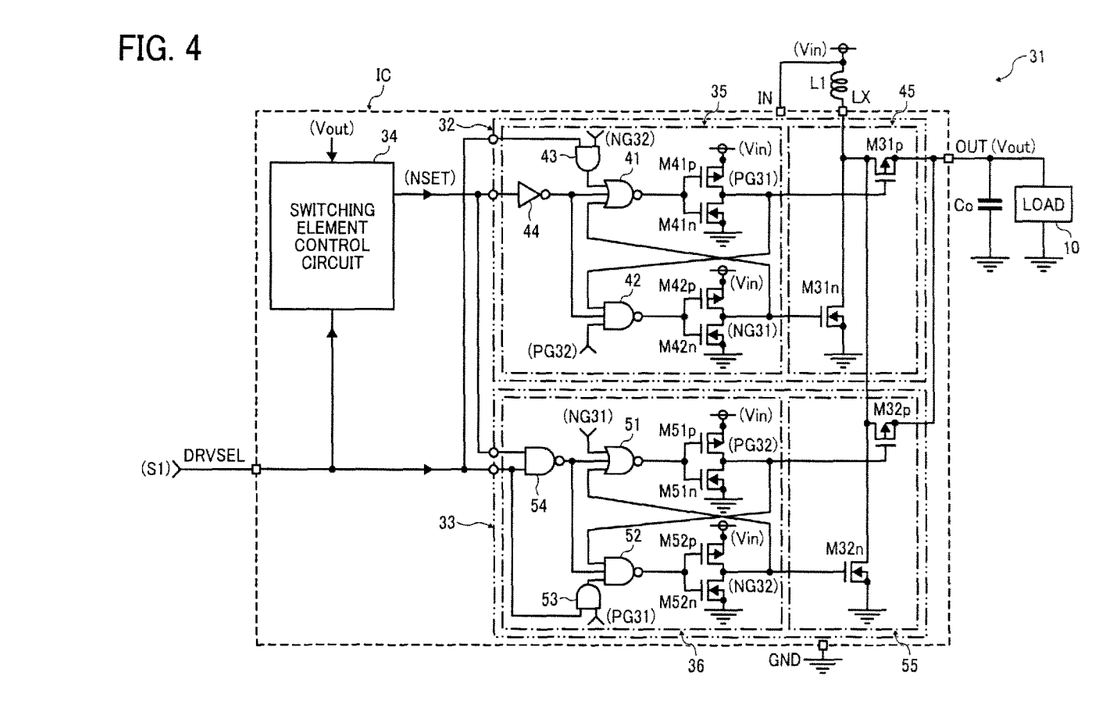
FIG. 4 shows an example of a circuit configuration of a switching power supply unit according to a fourth embodiment of the present invention.

FIG. 4 shows an example of a circuit configuration of a switching power supply unit 31 according to a forth embodiment of the present invention. The switching power supply unit 31 in FIG. 4 is of a boost, synchronous rectification type. It is configured to convert a voltage Vin supplied to the input terminal IN to a predetermined voltage Vout to supply it to the load 10 from the load connector OUT.

The switching power supply unit 31 comprises converters 32, 33, a switching element control circuit 34, an inductor L1, and a capacitor Co. It exemplifies a non-insulated, boost type switching power supply unit with the two converters, however, the basic control operation of the converter does not change depending on the number of converters.

All the elements of the switching power supply unit 31 except for the inductor L1 and the capacitor Co are integrated on a single switching regulator IC. The switching regulator IC comprises the input terminal IN, a feedback terminal FB (not shown), the control terminal DRVSEL as a select control terminal, the connection terminal LX and the ground terminal GND. The ground terminal GND is grounded. The converter 32 comprises a NMOS transistor M31n as an output switching element, a PMOS transistor M31p as a rectifying switching element, and a buffer circuit 35. The NMOS transistor M31n performs switching to charge the inductor L1 with a voltage Vin. The buffer circuit 35 generates on/off control signals NG31, PG31 which allow the NMOS transistor M31n and PMOS transistor M31p to perform switching, respectively, and outputs the signals to gates of the NMOS transistor M31n and the PMOS transistor M31p. Similarly, the converter 33 comprises an NMOS transistor M32n as an output switching element, a PMOS transistor M32p as a rectifying switching element, and a buffer circuit 36. The NMOS transistor M32n performs switching to charge the inductor L1 with a voltage Vin. The buffer circuit 36 generates on/off control signals NG32, PG32 which allow the NMOS transistor M32n and PMOS transistor M32p to perform switching, respectively, and outputs the signals to gates of the NMOS transistor M32n and the PMOS transistor M32p.

The buffer circuit 35 comprises PMOS transistors M41p, M42p, NMOS transistors M41n, M42n, a NOR circuit 41 with three inputs, a NAND circuit 42 with three inputs, an AND circuit 43 with two inputs, and an inverter circuit 44. The buffer circuit 36 comprises PMOS transistors M51p, M52p, NMOS transistors M51n, M52n, a NOR circuit 51 with three inputs, a NAND circuit 52 with three inputs, an AND circuit 53 with two inputs, and a NAND circuit 54 with two inputs. The switching element control circuit 34 is configured to detect a voltage Vout output from a load connector OUT between the switching power supply unit 31 and the load 10 and control the buffer circuits 35, 36 to turn the voltage Vout to a predetermined voltage. The buffer circuit 35 is configured to perform switching over the PMOS transistor M31p and the NMOS transistor M31n to reverse ON/OFF states thereof while the buffer circuit 36 is configured to perform switching over the PMOS transistor M32p and the NMOS transistor M32n to reverse ON/OFF states thereof. Also, the buffer circuits 35, 36 comprise general buffer functions and are configured to selectively use the converters 32, 33 according to a signal level applied to the control terminal DRVSEL. The control terminal DRVSEL is a select control terminal.

The inductor L1 is connected between the input terminal IN and the connection terminal LX and the capacitor Co and the load 10 are connected between the load connector OUT and the ground terminal GND. In the converter 32 the NMOS transistor M31n is connected between the connection terminal LX and the ground terminal GND, and the PMOS transistor M31p is connected between the connection terminal LX and the load connector OUT. Further, the PMOS transistor M41p and the NMOS transistor M41n are connected in series between the input terminal IN and the ground GND, to constitute an inverter circuit. The connecting point of the PMOS transistor M41p and the NMOS transistor M41n is an output of the inverter circuit which is connected to a gate of the PMOS transistor M31p. Gates of the PMOS transistor M41p and the NMOS transistor M41n are connected with each other and a connecting point thereof is an input of the inverter circuit which is connected to an output of the NOR circuit 41.

Further, in the converter 32 the PMOS transistor M42p and the NMOS transistor M42n are connected in series between the input terminal IN and the ground terminal GND, to constitute an inverter circuit. The connecting point of the PMOS transistor M42p and the NMOS transistor M42n is an output of the inverter circuit which is connected to a gate of the NMOS transistor M31n. Gates of the PMOS transistor M42p and the NMOS transistor M42n are connected with each other and a connecting point thereof is an input of the inverter circuit which is connected to an output of the NAND circuit 42.

First to third inputs of the NOR circuit 41 are connected to the output of the AND circuit 43, to the output of the inverter circuit 44, and to the connecting point of the PMOS transistor M42p and the NMOS transistor M42n, respectively. First to second inputs of the NAND circuit 42 are connected to a connecting point of the PMOS transistor M41p and the NMOS transistor M41n and to the output of the inverter circuit 44, respectively. A third input of the NAND circuit 42 receives an on/off control signal PG32 via the gate of the PMOS transistor M32p. One input of the AND circuit 43 is connected to the control terminal DRVSEL while the other input thereof receives an on/off control signal NG32 via the gate of the NMOS transistor M32n. A switching control signal NSET is input to the input of the inverter circuit 44 from the switching element control circuit 34.

Similarly, in the converter 33 the NMOS transistor M32n is connected between the connection terminal LX and the ground terminal GND, and the PMOS transistor M32p is connected between the connection terminal LX and the load connector OUT. Further, the PMOS transistor M51p and the NMOS transistor M51n are connected in series between the input terminal IN and the ground terminal GND, to constitute an inverter circuit. The connecting point of the PMOS transistor M51p and the NMOS transistor M51n is an output of the inverter circuit which is connected to a gate of the PMOS transistor M32p. Gates of the PMOS transistor M51p and the NMOS transistor M51n are connected with each other and their connecting point is an input of the inverter circuit which is connected to an output of the NOR circuit 51.

Further, in the converter 33 the PMOS transistor M52p and the NMOS transistor M52n are connected in series between the input terminal IN and the ground terminal GND, to constitute an inverter circuit. The connecting point of the PMOS transistor M52p and the NMOS transistor M52n is an output of the inverter circuit which is connected to a gate of the NMOS transistor M32n. Gates of the PMOS transistor M52p and the NMOS transistor M52n are connected with each other, and their connecting point is an input of the inverter circuit which is connected to an output of the NAND circuit 52.

First input of the NOR circuit 51 receives an on/off control signal NG31 via the gate of the NMOS transistor M31n. Second to third inputs thereof are connected to an output of the NAND circuit 54 and to a connecting point of the PMOS transistor M52p and the NMOS transistor M52n, respectively. First to third inputs of the NAND circuit 52 are connected to a connecting point of the PMOS transistor M51p and the NMOS transistor M51n, to an output of the NAND circuit 54, and to an output of the AND circuit 53, respectively. One input of the AND circuit 53 is connected to the control terminal DRVSEL while the other input thereof receives an on/off control signal PG31 via the gate of the PMOS transistor M31p. A switching control signal NSET is input to one input of the NAND circuit 54 from the switching element control circuit 34. The other input of the NAND circuit 54 is connected to the control terminal DRVSEL.

The voltage Vout of the switching power supply unit 31 is fed back to the switching element control circuit 34. The switching element control circuit 34 is configured to generate a switching control signal NSET for output according to a converter select signal S1 and the voltage Vout fed back from the feedback terminal FB so as to turn the voltage Vout to the predetermined voltage. The converter select signal S1 is input to the control terminal DRVSEL for selecting a converter.

According to the switching power supply unit 31 in FIG. 4, a size of the NMOS transistor M31n, M32n and that of the PMOS transistors M31p, M32p are assumed to satisfy the following relations:

(size of PMOS transistor M31p) < (size of PMOS transistor M32p)

(size of NMOS transistor M31n) < (size of NMOS transistor M32n)

The converter 32 includes a switch pair 45 of the PMOS transistor M31p and the NMOS transistor M31n in small size while the converter 33 includes a switch pair 55 of the PMOS transistor M32p and the NMOS transistor M32n in large size. In general, a buffer circuit turning on and off a switching element can be reduced in size when a switching element is small in size. Accordingly, it is possible to reduce power consumption of the buffer circuit for turning on/off the switching element.

According to the switching regulator IC in the present embodiment, the sizes of the buffer circuits 35, 36 are adjusted in accordance with the sizes of the switch pairs 45, 55 so that the buffer circuit 35 is smaller than the buffer circuit 36 in size. Therefore, the buffer circuit 35 consumes less power than the buffer circuit 36 for the switching control.

Thus, when a load current flowing in the load 10 is small, that is, in a low load state, the converter 32 is selectively used and the switching element in a smaller size is turned on/off, which can decrease an amount of charge/discharge current relative to gate capacities of the PMOS transistor M31p and the NMOS transistor M31n. Moreover, since the buffer circuit 35 consumes less electric current than the buffer circuit 36, the switching power supply unit 31 can exert improved power conversion efficiency in a low load state.

Further, when a load current flowing in the load 10 is large, that is, in a high load state, the converter 33 including the large-size switching element with a small on-resistance is used, improving the power conversion efficiency in a high load state. Moreover, concurrently driving the converters 32, 33 during a high load state results in achieving higher power conversion efficiency.

In the above configuration, the switching element control circuit 34 detects the voltage Vout and generates a switching control signal NSET for output to turn the voltage Vout to the predetermined voltage. For example, the switching element control circuit 34 executes PWM control to control a pulse width of the switching control signal PSET so that the voltage Vout turns to the predetermined voltage. With a large voltage Vout, the switching element control circuit 34 reduces a duty ratio of the switching control signal NSET to shorten the on-time of the NMOS transistors M31n, M32n as well as lengthen the on-time of the PMOS transistors M31p, M32p to reduce the voltage Vout output from the switching power supply unit 31.

Oppositely, with a low voltage Vout, the switching element control circuit 34 increases a duty ratio of the switching control signal NSET to lengthen the on-time of the NMOS transistors M31n, M32n as well as shorten the on-time of the PMOS transistors M31p, M32p to increase the voltage Vout output from the switching power supply unit 31. By repeating the above, the output voltage Vout is controlled to be constant at the predetermined voltage.

The converter select signal S1 is input to the control terminal DRVSEL from exterior of the switching regulator IC. During a low load state of the load 10, the converter select signal S1 is set to low level, and an output level of the AND circuit 43 is also turned to low level irrespective of the on/off control signal NG32. Therefore, the NOR circuit 41 and the NAND circuit 42 output signals of levels inverse to each other to the PMOS transistor M31p and the NMOS transistor M31n in accordance with the switching control signal NSET. Thus, the NMOS transistor M31n and the PMOS transistor M31p perform switching inversely to each other in accordance with the switching control signal NSET.

Similarly, an output level of the AND circuit 53 is turned to low level irrespective of the on/off control signal PG31. An output level of the NAND circuit 54 is turned to high level irrespective of the switching control signal NSET. Therefore, an output level of the NOR circuit 51 is turned into low level while that of the NAND circuit 52 is turned into high level. Accordingly, the NMOS transistor M32n and the PMOS transistor M32p are both placed into a break state.

Meanwhile, during a high load state of the load 10, the converter select signal S1 is set to high level. The AND circuit 43 outputs a signal of the same level as that of the on/off control signal NG32. Thus, an output level of the NOR circuit 41 is turned into low level when at least one of the output signal of the inverter circuit 44 and the on/off control signals NG31, NG32 is turned into high level so that the PMOS transistor M31p is placed into a break state.

Further, an output level of the NAND circuit 42 is turned into low level when all of the output signal of the inverter circuit 44 and the on/off control signals PG31, PG32 are turned into high level so that the NMOS transistor M31n becomes conductive. On the other hand, the output level of the NAND circuit 42 is turned into high level when at least one of the output signal of the inverter circuit 44 and the on/off control signals PG31, PG32 is turned into low level so that the NMOS transistor M31n is placed into a break state.

An output level of the AND circuit 53 coincides with that of the on/off control signal PG31 and an output level of the NAND circuit 54 is inverse to the level of the switching control signal NSET. The output level of the NOR circuit 51 is turned into low level when at least one of the output signal of the NAND circuit 54 and the on/off control signals NG31, NG32 are turned into high level so that the PMOS transistor M32p is placed into a break state. On the other hand, the output level of the NOR circuit 51 is turned into high level when all of the output signal of the NAND circuit 54 and the on/off control signals NG31, NG32 are turned into low level so that the PMOS transistor M32p becomes conductive.

Meanwhile, the output level of the NAND circuit 52 is turned into low level when all of the output signal of the NAND circuit 54 and the on/off control signals PG31, PG32 are turned into high level so that the NMOS transistor M32n becomes conductive. The output level of the NAND circuit 52 is turned into high level when at least one of the output signal of the NAND circuit 54 and the on/off control signals PG31, PG32 is turned into low level so that the NMOS transistor M32n is placed into a break state.

Fifth Embodiment

Figure 5:
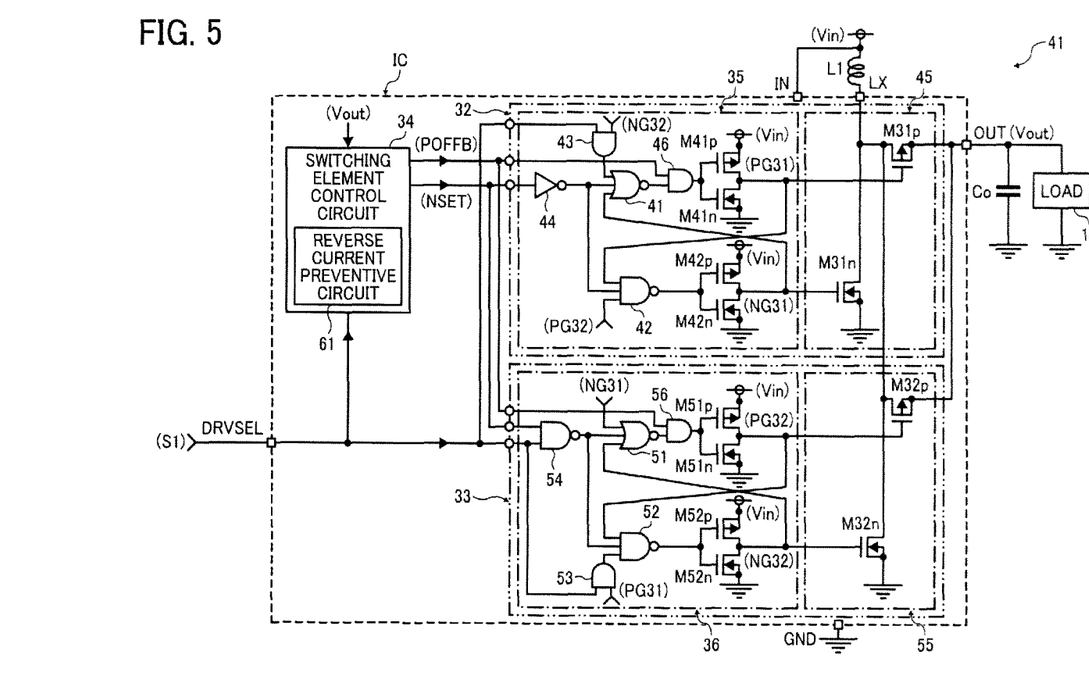
FIG. 5 shows an example of a circuit configuration of a switching power supply unit according to a fifth embodiment of the present invention.

FIG. 5 shows a switching power supply unit 41 according to a fifth embodiment which additionally comprises a reverse current preventive circuit on the switching regulator IC of FIG. 4. Only a difference from the unit in FIG. 4 will be described in the following. The difference is in adding a reverse current preventive circuit 61 in the switching element control circuit 34, and adding AND circuits 46, 56 with two inputs in the converters 2, 3, respectively. The reverse current preventive circuit 61 is configured to prevent a reverse current from flowing from the load connector OUT to the connection terminal LX.

In FIG. 5 one input of the AND circuit 46 is connected with an output of the NOR circuit 41 while the other input thereof receives an off-signal POFFB turning off the NMOS transistors M31n, M32n from the reverse current preventive circuit 61. An output of the AND circuit 46 is connected with a connecting point of gates of the PMOS transistor 41p and the NMOS transistor 41n. Similarly, one input of the AND circuit 56 is connected with an output of the NOR circuit 51 while the other input thereof receives an off-signal POFFB from the reverse current preventive circuit 61. An output of the AND circuit 56 is connected with a connecting point of gates of the PMOS transistor 51p and the NMOS transistor 51n.

Although not shown, the reverse current preventive circuit 61 is configured to detect respective voltages of the output terminal OUT and the connection terminal LX, determine that occurrence of a reverse current is possible or is detected when the voltage of the output terminal OUT coincides with or exceeds the voltage of the connection terminal LX, and output an off-signal POFFB of low level, for example. In such a case the output level of the AND circuit 46 is turned into low level irrespective of the output level of the NOR circuit 41, bringing the PMOS transistor M31p into a break state. Similarly, the output level of the AND circuit 56 is turned into low level irrespective of the output level of the NOR circuit 51, bringing the PMOS transistor M32p into a break state.

When the voltage of the connection terminal LX exceeds that of the output terminal OUT, the reverse current preventive circuit 61 determines that there is no possibility or detection of occurrence of the reverse current and outputs the off-signal POFFB of low level. Then, the output level of the AND circuit 46 turns to the same as that of the NOR circuit 41 while the output level of the AND circuit 56 turns to the same as that of the NOR circuit 51.

Thus, upon detection of the reverse current from the load connector OUT of the switching power supply unit 31 and the load 10 to the PMOS transistors M31p, M32p, the PMOS transistors M31p, M32p are both forcibly placed into a break state, thereby preventing the reverse current. This accordingly makes it possible to prevent a decrease in the power conversion efficiency due to occurrence of the reverse current. The switching power supply unit 41 includes a reverse current detecting function in addition to the control terminal DRVSEL for selectively using the converters 32, 33 having small and large sized switching elements respectively. This further enables an improved power conversion efficiency of the unit 41 in a low load state.

Sixth Embodiment

Figure 6:
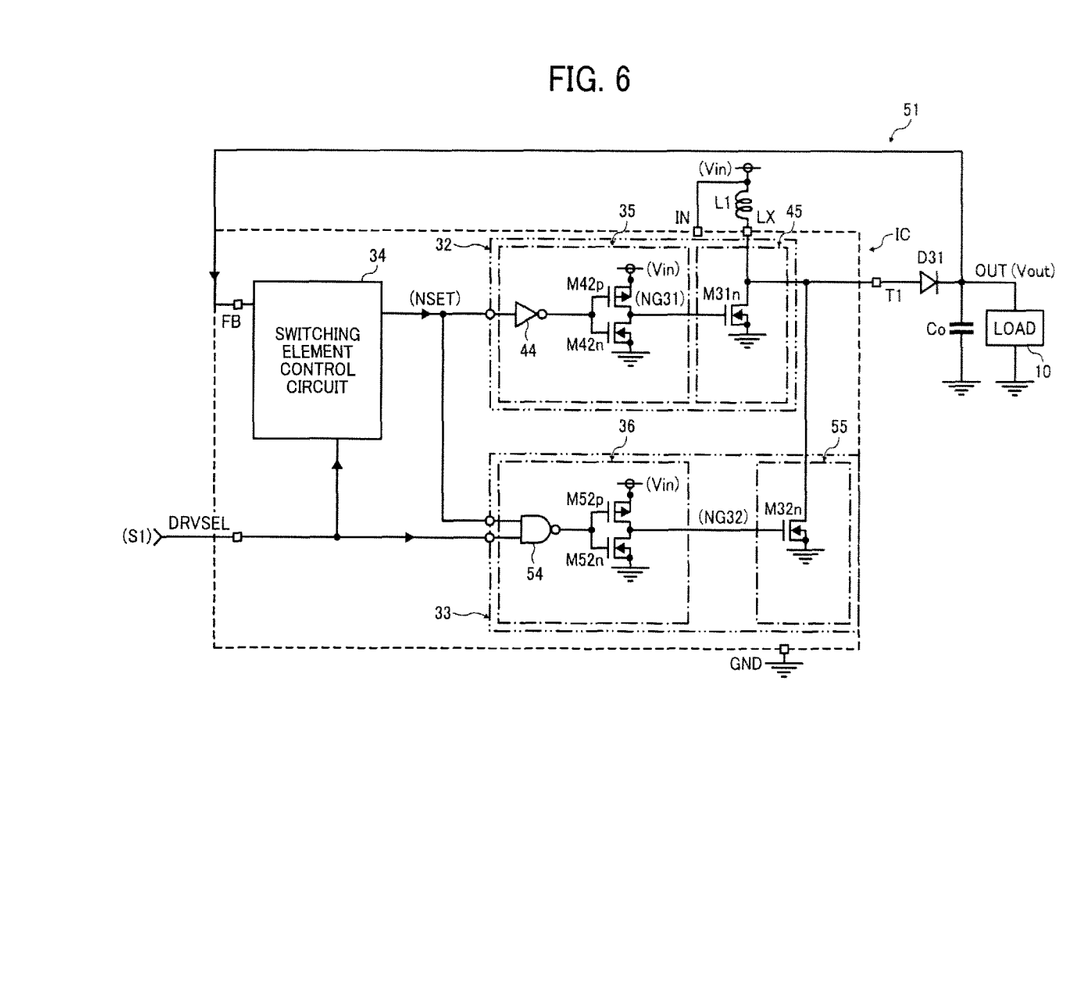
FIG. 6 shows an example of a circuit configuration of a switching power supply unit according to a sixth embodiment of the present invention.

Next, FIG. 6 shows an example of a non-synchronous rectification, boost type switching power supply unit. A difference from the unit in FIG. 4 is in addition of a rectifying diode D31 in replace of the PMOS transistors M31p, M32p. Only the difference will be described in the following. The switching power supply unit 51 is thus configured to exclude the PMOS transistors M41p, M51p, NMOS transistors M41n, M51n, NOR circuits 41, 51, NAND circuits 42, 52, and AND circuits 43, 43.

Further, the switching power supply unit 51 in FIG. 6 comprises the converter 32, 33, switching element control circuit 34, rectifying diode D31, and inductor L1, and capacitor Co.

Every circuit of the switching power supply unit 51 except for the rectifying diode D31, inductor L1 and the capacitor Co is integrated on a single switching regulator IC which comprises an input terminal IN, a feedback terminal FB, control terminal DRVSEL, connection terminals LX, T1, and a ground terminal GND. The ground terminal GND is grounded, and the input terminal IN is applied with a voltage Vin. The converter 32 comprises an NMOS transistor M31n, and a buffer circuit 35. The buffer circuit 35 generates an on/off control signal NG31 which allows the NMOS transistor M31n to perform switching, and output it to a gate of the NMOS transistor M31n. Similarly, the converter 33 comprises an NMOS transistor M32n and a buffer circuit 36. The buffer circuit 36 generates an on/off control signal NG32 which allows the NMOS transistor M32n to perform switching, and outputs it to a gate of the NMOS transistor M32n.

The buffer circuit 35 comprises a PMOS transistor M42p, an NMOS transistor M42n, and the inverter circuit 44. The buffer circuit 36 comprises a PMOS transistor M52p, an NMOS transistor M52n, and a NAND circuit 54 with two inputs. The switching element control circuit 34 is configured to detect a voltage Vout output from a load connector OUT between the switching power supply unit 51 and the load 10 and control the buffer circuits 35, 36 to perform switching over the NMOS transistors M31n, M32n so that the voltage Vout turns to a predetermined voltage.

A cathode of the rectifying diode D31 is connected with the load connector OUT and an anode thereof is connected with the connection terminal T1. The NMOS transistor M31n is connected between the connection terminal LX of the converter 32 and the ground GND. The PMOS transistor M42p and the NMOS transistor M42n are connected in series between the input terminal IN and the ground GND. The connecting point of the PMOS transistor M42p and the NMOS transistor M42n is connected to a gate of the NMOS transistor M31n. Further, gates of the PMOS transistor M42p and the NMOS transistor M42n are connected with each other, and a connecting point thereof is connected with an output of the inverter circuit 44. An input of the inverter circuit 44 receives a switching control signal NSET.

Further, the NMOS transistor M32n is connected between the connection terminal LX of the converter 33 and the ground GND. The PMOS transistor M52p and the NMOS transistor M52n are connected in series between the input terminal IN and the ground GND. The connecting point of the PMOS transistor M52p and the NMOS transistor M52n is connected to a gate of the NMOS transistor M32n. Gates of the PMOS transistor M52p and the NMOS transistor M52n are connected with each other, and a connecting point thereof is connected with an output of the NAND circuit 54. One input of the NAND circuit 54 receives a switching control signal NSET while the other input thereof is connected with the control terminal DRVSEL.

With the above configuration, the switching element control circuit 34 is configured to detect a voltage Vout output from the feedback terminal FB and generate and output a switching control signal NSET so that the voltage Vout turns to the predetermined voltage. For example, the switching element control circuit 34 executes PWM control to control a pulse width of the switching control signal NSET as a pulse signal so that the voltage Vout turns to the predetermined voltage. With a large voltage Vout, the switching element control circuit 34 reduces a duty ratio of the switching control signal NSET to shorten the on-time of the NMOS transistors M31n, M32n to reduce the voltage Vout output from the switching power supply unit 51.

Oppositely, with a low voltage Vout, the switching element control circuit 34 increases a duty ratio of the switching control signal NSET to lengthen the on-time of the NMOS transistors M31n, M32n to increase the voltage Vout output from the switching power supply unit 51. By repeating the above, the output voltage Vout is controlled to be constant at the predetermined voltage.

During a low load state of the load 10, the converter select signal S1 is set to low level, and an output level of the NAND circuit 54 is turned to high level irrespective of the switching control signal NSET. Therefore, the NMOS transistor M32n is turned off and placed into a break state irrespective of the switching control signal NSET. Meanwhile, during a high load state of the load 10, the converter select signal S1 is set to high level so that an output level of the NAND circuit 54 becomes inverse to a level of the switching control signal NSET.

The switching power supply unit 51 of a non synchronous rectification type comprises the rectifying diode D31 as an exterior element which requires the additional connection terminal T1 on the switching regulator IC. Due to a decrease in the voltage of the rectifying diode D1, the switching power supply unit 51 exerts a slight decrease in the power conversion efficiency. However, it has an advantage of surely preventing occurrence of the reverse current flowing from the load connector OUT to the inductor L1.

Furthermore, the switching power supply unit 51 in FIG. 6 can be configured without the rectifying switching elements and control circuits for the rectifying switching elements, enabling a reduction in a layout size of the control circuits. It is advantageous in terms of chip size reduction from the units 31, 41 in FIGS. 4, 5.

Thus, the switching power supply unit 51 according to the present embodiment is configured that only the converter 32 performs switching during the low load state of the load 10 and both of the converters 32, 33 do perform switching during the high load state of the load 10. Therefore, it can maintain high power conversion efficiency in accordance with a load state. Moreover, the switching power supply unit 51 is user-friendly since the two converters 32, 33, switching element control circuit 34, and control terminal DRVSEL are integrated on a single chip.

Note that the first to sixth embodiments have described an example in which the two converters are provided. However, the present invention should not be limited to such an example. The present invention is also applicable to one with multiple converters. Moreover, the present invention is also applicable to a buck-boost type switching power supply unit or an inverse type switching power supply unit in addition to buck-type and boost-type switching power supply units.

The switching power supply unit according to any of the above embodiments can be configured without an element such as a load current detecting circuit which leads to an increase in a chip size. Also, it can optimally select the sizes of the output switching element and the rectifying switching element by a select signal from a controller in accordance with a load state as well as select the size of the buffer circuit turning on and off the switching elements, thereby realizing high power conversion efficiency in accordance with a state of the load.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A switching power supply unit of a non-insulated, synchronous rectification type which converts a voltage input to an input terminal into a predetermined voltage and outputs an output voltage, comprising:
an inductor;
a plurality of output switching elements which perform switching in accordance with an on/off control signal input to a control electrode and charge the inductor with the output voltage;
a plurality of rectifying switching elements associated with the output switching elements and discharging the inductor when the associated output switching elements are turned off to stop charging the inductor;
a switching element control circuit which generates and outputs a switching control signal which allows the output switching elements to perform switching and the rectifying switching elements to perform reverse switching to the switching of the output switching elements so that the output voltage turns to the predetermined voltage;
a switching regulator integrated circuit including a select control terminal to which a select signal is input from an exterior; and
a plurality of buffer circuits associated with the output switching elements and the rectifying switching elements, each buffer circuit amongst the plurality of buffer circuits controlling, in response to the select signal, an associated pair of the output switching element and the rectifying switching element to operate in accordance with the switching control signal from the switching element control circuit,
wherein the output switching elements, the rectifying switching elements, the switching element control circuit and the buffer circuits are integrated on the switching regulator integrated circuit,
wherein a first buffer circuit of the plurality of buffer circuits outputs a first on/off control signal to a first output switching element of the plurality of output switching elements, and a second buffer circuit of the plurality of buffer circuits outputs a second on/off control signal to a second output switching element of the plurality of output switching elements,
wherein each of (i) the switching control signal output from the switching element control circuit and (ii) the select signal received through the select control terminal is input into the plurality of buffer circuits to control the first on/off signal and the second on/off signal,
wherein the first on/off control signal output by the first buffer circuit to the first output switching element of the plurality of output switching elements is also input to the second buffer circuit, and the second on/off control signal output by the second buffer circuit to the second output switching element of the plurality of output switching elements is also input to the first buffer circuit, to control switching between the first output switching element and one of the rectifying switching elements and to control switching between the second output switching element and another of the plurality of rectifying switching elements, and
wherein a size of the first buffer circuit is smaller than a size of the second buffer circuit.

2. The switching power supply unit according to claim 1, wherein:
the output switching elements have different current supply capacities from each other; and
the rectifying switching elements have current supply capacities in accordance with those of the associated output switching elements, respectively.

3. The switching power supply unit according to claim 2, wherein the buffer circuits drive the associated output switching elements and rectifying switching elements to turn on and off in an optimal length of time according to the respective current supply capacities.

4. The switching power supply unit according to claim 1, wherein:
the switching element control circuit comprises a reverse current preventive circuit which detects, from the output voltage, a reverse current flowing to the rectifying switching elements, and upon detecting the reverse current, generates and outputs a predetermined reverse current detection signal which places the rectifying switching elements into a break state; and
each of the buffer circuits places an associated one of the rectifying switching elements into a break state irrespective of the input switching control signal when receiving the predetermined reverse current detection signal from the reverse current preventive circuit.

5. The switching power supply unit according to claim 1, wherein
the switching power supply unit is of a buck type which steps down a voltage input to the input terminal to the predetermined voltage for output.

6. The switching power supply unit according to claim 1, wherein the switching power supply unit is of a boost type which steps up a voltage input to the input terminal to the predetermined voltage for output.

7. The switching power supply circuit according to claim 1, further comprising:
a first associated pair including a first output switching element of the plurality of output switching elements and a first rectifying switching clement of the plurality of rectifying switching elements, the first associate pair being controlled by a first buffer circuit of the plurality of buffer circuits; and
a second associated pair including a second output switching element of the plurality of output switching elements and a second rectifying switching element of the plurality of rectifying switching elements, the second associated pair being controlled by a second buffer circuit of the plurality of buffer circuits,
wherein the first output switching element, the first rectifying switching element and the first buffer circuit are smaller than the second output switching element, the second rectifying switching element and the second buffer circuit, respectively.

8. The switching power supply circuit according to claim 1, wherein the switching element control circuit outputs the switching control signal to select the first buffer circuit of smaller size when a load current flowing in a load is relatively small, and to select the second buffer circuit of larger size when the load current flowing in the load is relatively large.

9. A switching power supply unit of a non-insulated, non-synchronous rectification type which converts a voltage input to an input terminal into a predetermined voltage and outputs an output voltage, comprising:
an inductor;
a plurality of output switching elements which perform switching in accordance with an on/off control signal input to a control electrode and charge the inductor with the output voltage;
a rectifying element which discharges the inductor when the output switching elements are turned off to stop charging the inductor;
a switching element control circuit which generates and outputs a switching control signal which allows the output switching elements to perform switching so that the output voltage turns to the predetermined voltage;
a switching regulator integrated circuit including a select control terminal to which a select signal is input from exterior; and
a plurality of buffer circuits associated with the output switching elements, each buffer circuit amongst the plurality of buffer circuits controlling, in response to the select signal, the associated output switching element to operate in accordance with the switching control signal from the switching element control circuit,
wherein the output switching elements, the switching element control circuit and the buffer circuits are integrated on the switching regulator integrated circuit,
wherein a first buffer circuit of the plurality of buffer circuits outputs a first on/off control signal to a first output switching clement of the plurality of output switching elements, and a second buffer circuit of the plurality of buffer circuits outputs a second on/off control signal to a second output switching element of the plurality of output switching elements,
wherein each of (i) the switching control signal output from the switching element control circuit and (ii) the select signal received through the select control terminal is input into the plurality of buffer circuits to control the first on/off signal and the second on/off signal,
wherein when the output voltage is below the predetermined voltage, the first buffer circuit performs switching of the first on/off control signal based on (i) the switching control signal output from the switching element control circuit and (ii) the select signal received through the select control terminal, and
when the output voltage is above the predetermined voltage, the first buffer circuit and the second buffer circuit perform switching of the first on/off control signal and the second on/off control signal based on the switching control signal and the select signal, and
wherein a size of the first buffer circuit is smaller than a size of the second buffer circuit.

10. The switching power supply unit according to claim 9, wherein the output switching elements have different current supply capacities from each other.

11. The switching power supply unit according to claim 10, wherein the buffer circuits drive the associated output switching elements to turn on and off in an optimal length of time according to the respective current supply capacities.

12. The switching power supply unit according to claim 9, wherein the switching power supply unit is of a buck type to step down a voltage input to the input terminal to the predetermined voltage for output.

13. The switching power supply unit according to claim 9, wherein the switching power supply unit is of a boost type to step up a voltage input to the input terminal to the predetermined voltage for output.

* * * * *